March 20, 1962     S. A. MURDOCK ET AL     3,026,295
GRAFT COPOLYMERS COMPRISED OF CERTAIN MONOMERIC DIACRYLIC
ESTERS OF POLYGLYCOLS ON N-VINYL-3-MORPHOLINONE POLYMER
SUBSTRATES, IMPROVED ACRYLONITRILE POLYMER COMPOSITIONS
OBTAINABLE THEREWITH, AND METHOD OF PREPARATION
Filed Dec. 3, 1959

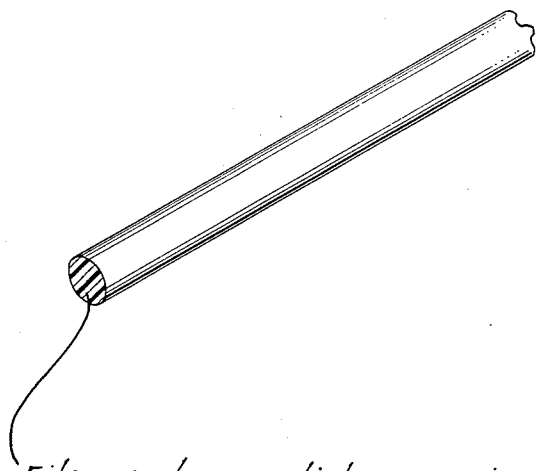

Filamentous article comprised of an acrylonitrile polymer having a graft copolymer comprising a monomeric diacrylic ester of a polyglycol graft copolymerized upon an N-vinyl-3-morpholinone polymer substrate incorporated therein.

INVENTORS.
Stanley A. Murdock
Ardy Armen
BY Jerome Kudry
THEIR ATTORNEY

United States Patent Office 3,026,295
Patented Mar. 20, 1962

3,026,295
GRAFT COPOLYMERS COMPRISED OF CERTAIN MONOMERIC DIACRYLIC ESTERS OF POLYGLYCOLS ON N-VINYL-3-MORPHOLINONE POLYMER SUBSTRATES, IMPROVED ACRYLONITRILE POLYMER COMPOSITIONS OBTAINABLE THEREWITH, AND METHOD OF PREPARATION
Stanley A. Murdock, Concord, Calif., and Ardy Armen, Denbigh, Va., assignors to The Dow Chemical Company, Midland, Mich., a corporation of Delaware
Filed Dec. 3, 1959, Ser. No. 857,168
17 Claims. (Cl. 260—45.5)

The present invention resides in the general field of organic chemistry and contributes specifically to the polymer art, especially with respect to certain cross-linked, water-insoluble graft copolymer compositions and fiber-forming polymer blends obtainable therewith. It is particularly concerned with graft copolymers of certain polyfunctional monomeric diacrylate and dimethacrylate esters of polyglycols on or with preformed substrate or "backbone" N-vinyl-3-morpholinone polymers (hereinafter referred to as VM polymers). Such graft copolymeric products have especial utility as dye-receptive, antistatic and stabilizing additaments for acrylonitrile polymer compositions which, advantageously, may be of the fiber-forming variety.

The invention is thus also concerned with the compositions that may be obtained by blending the graft copolymers with acrylonitrile polymers, as well as with shaped articles which have been fabricated from such compositions and which, as a consequence, have significantly enhanced properties and characteristics as regards improvements in and relating to enhanced dye-receptivity, minimized inherent propensity to accumulate electrostatic charges, natural stability to various deteriorating influences, including stability against becoming deleteriously influenced and degraded upon exposure to heat at elevated temperatures and to light.

Within the scope and purview of the invention, there are comprehended (1) the various novel and utile graft copolymers of the indicated variety; (2) the advantageous polymer compostions, particularly fiber-forming compositions, obtained by blending the graft copolymers with acrylonitrile polymers; (3) various shaped articles fabricated from and comprised of the graft copolymer-containing acrylonitrile polymer compositions; and (4) methods for the preparation of the above-indicated compositions.

It is the main purpose and primary design of the present invention to provide and make available graft copolymers of certain monomeric diacrylate and dimethacrylate esters of polyglycols on VM polymer substrates or "backbones," which graft copolymer products are especially well suited for being incorporated in acrylonitrile polymer compositions, particularly compositions of polyacrylonitrile, to serve in the indicated treble capacity of dye-assisting adjuvants, antistatic agents and stabilizing ingredients.

It is also a principal aim and chief concern of the invention to provide and make available acrylonitrile polymer compositions and shaped articles therefrom that contain the above-indicated and hereinafter more fully delineated type of graft copolymeric additaments which compositions have, as intrinsic distinguishing characteristics, excellent receptivity of and acceptability for any of a wide variety of dyestuffs; permanently imbued antistatic properties that are unusually good for and not commonly encountered in polymeric materials of such substances; and efficacious natural stability to heat and light, as well as to certain chemical conditions, such as alkaline environments.

The graft copolymers of the present invention which have the indicated capacity and utility as additaments for acrylonitrile polymer compositions are comprised of (b) a preformed VM polymer trunk or base substrate upon which there is graft copolymerized a (a) diacrylate or dimethacrylate ester of certain polyglycols or their mixtures, as hereinafter more fully illustrated. Advantageously, in many instances, the graft copolymers of the present invention may be comprised of mixed graft substituents from diverse monomers, a portion of such graft substituents being derived from (1) the diacrylate or dimethacrylate esters of polyglycols and the remainder being graft copolymerized substituents on the VM polymer substrate of (2) certain monomeric, alkenyl group-containing organic sulfonic acid compounds, or their derivatives, which monomeric organic sulfonic acid compounds are hereinafter more fully delineated.

The polymer blend compositions of the present invention which fulfill the above-indicated ends and offer corollary advantages and benefits, particularly as fiber-forming compositions as will hereinafter be manifest, are, in essence, comprised of an intimate and practically inseparable blend or alloy constitution of (A) an acrylonitrile polymer that contains in the polymer molecule at least about 80 weight percent of polymerized acrylonitrile, any balance being copolymerized units of at least one other ethylenically unsaturated monomeric material that is copolymerizable with acrylonitrile to provide fiber-forming acrylonitrile polymer products which acrylonitrile polymer is preferably of the fiber-forming variety and, most advantageously, is polyacrylonitrile and (B) a minor proportion of the above-indicated variety of beneficial graft copolymeric additament that functions in the described manner.

The methods of the invention by which the herein contemplated advantageous compositions may be made involve preparation of the graft copolymers, as well as incorporation of a minor proportion of the graft copolymer products as a beneficial additament in and with an acrylonitrile polymer base by any of several beneficial techniques, hereinafter more thoroughly defined, adapted to suitably accomplish the desired result.

Without being limited to or by the specific embodiments and modes of operation set forth, the invention is exemplified in and by the following didactic illustrations wherein, unless otherwise indicated, all parts and percentages are to be taken on a weight basis.

ILLUSTRATION A

Into a 500 ml., 3 neck, round bottom flask that is equipped with an efficient agitator, a nitrogen sparger and fractionating column, there is charged about 100 grams of a polyglycol (having a molecular weight of about 600) and of the general structural formula: $HO(-CH_2CH_2O-)_{12}CH_2CH_2OH$; 134 grams of methyl methacrylate; 5 grams of para-toluene sulfonic acid; and about 6.7 grams of polymerization inhibiting hydroquinone. The mixture of charged ingredients in the reactor is brought to the boil and maintained at that temperature with the fractionating column set at total reflux until the overhead temperature reaches about 64–65° C. When this temperature is attained, the overhead azeotrope of methanol and methyl methacrylate is removed for a period of about 6 hours at a temperature of 65 to 67° C. After this 6-hour period, the overhead temperature increases to about 80° C. The reaction is then terminated by removal of the heat source.

The excess methyl methacrylate is then removed from the reaction mass by vacuum distillation. About 1 liter of water is then added to the reaction mass and the solid polymer particles that are formed therein are removed by filtration. The aqueous solution of the polyglycol type monomer that remains is then passed through an ion exchange bed consisting of an anionic quaternary ammonium type resin ("Dowex-1") to remove the hydroquinone. The uninhibited monomer solution is then stored at a temperature of about −30° C.

About 2.1 grams of the prepared monomeric diester is then charged to another reactor which is equipped with agitating means, a nitrogen sparger, and a total reflux condenser. There is also charged into the second reactor about 4.9 grams of poly-N-vinyl-3-morpholinone (PVM); 28.3 grams of water and 0.04 gram of potassium persulfate. The relative viscosity of the PVM in water at 25° C. is about 1.85 at a concentration of 1 gram of the water-soluble polymer in 100 ml. of solution. The resulting solution is heated to a temperature of about 50° C. and synthermally maintained thereat for a period of about 32 hours under a nitrogen blanket. The reaction is then terminated and the graft copolymer-containing solution is removed from the reactor.

The polymer product is a clear light brown solution that has a polymer content of about 19.5 percent. Upon analysis, it is found that about 95 percent of the diester monomer is converted to a graft copolymer product with the PVM. The graft copolymer product contains about 29 percent of the graft copolymerized substituents and 71 percent of the PVM.

The graft copolymer is found to be an excellent additive for enhancing the dye-receptivity of synthetic acrylonitrile polymer textile fibers (such as those based essentially on polyacrylonitrile) to many of a wide variety of dyestuffs; decreasing the propensity of such fibers to accumulate charges of static electricity; and stabilizing the fiber to light, heat and alkaline media when it is incorporated in polyacrylonitrile in the manner set forth in the following example.

ILLUSTRATION B

Following the procedure of Illustration A, and using the same monomeric diester of the polyglycol as therein described, a graft copolymeric additament is prepared from the following charge:

| | Grams |
|---|---|
| Monomeric diester (from Example A) | 29.3 |
| Sodium styrene sulfonate | 8.2 |
| PVM (as in Illustration A) | 87.5 |
| Water | 471.7 |
| Ammonium persulfate | 0.8 |

The charged ingredients, which have a pH of about 6 (after adjustment with hydrochloric acid), are maintained at a temperature of about 70° C. for 21 hours. During this time the mixture of the diester monomer and the organic sulfonic acid monomer forms a mixed graft copolymer product on the PVM. Conversion of the monomers to graft copolymer product is found to be about 91.3 percent. The graft copolymer product, which is obtained in the aqueous reaction mass as a slightly colored, water-insoluble gel, is found to contain about 72 percent of PVM, about 23 percent of graft copolymerized diester units and about 5 percent of graft copolymerized sodium styrene sulfonate units. A stable dispersion for use in impregnating polyacrylonitrile aquagel fiber is made by putting the gel with additional water through a Waring Blendor so as to obtain an aqueous dispersion of the graft copolymer product containing about 9.4 percent of dispersed polymer solids.

Polyacrylonitrile fibers containing about 11.8 percent of the above copolymer product are prepared by impregnating filamentary structures that are an aquagel condition (after having been salt-spun and wet-stretched) in and with a dissolved aqueous dispersion of the graft copolymer product that contains about 1.5 percent of the graft copolymer solids. The polyacrylonitrile aquagel fiber is obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contains about 42 percent of dissolved zinc chloride to form a multiple filament tow. After being spun, the tow bundle of coagulated polyacrylonitrile aquagel fiber is washed substantially free from salt upon being withdrawn from the coagulating bath and then wet-stretched for orientation to a total stretched length that is about thirteen times (13×) its original extruded length. The aquagel fiber is then passed through the mentioned aqueous impregnating bath of the dissolved copolymer additive so as to become impregnated therewith to the indicated extent.

Following the impregnation, the aquagel fiber is irreversibly dried at 150° C. to destroy the water-hydrated structure and convert it to a finished fiber form. It is then heat set for five minutes at 150° C. The finally obtained 2.5 denier fiber product has a tenacity of about 4 grams per denier, an elongation of about 28 percent, and a wet yield strength of about 0.95 gram per denier. The graft copolymer-containing acrylonitrile polymer fiber product is found to have excellent natural stability to heat and light as well as against becoming degraded under the influence of aqueous alkaline media at pH levels as high as 10. It is found to be nearly free of propensity to accumulate charges of static electricity upon handling; being about commensurate with viscose rayon fibers in this regard. As is widely appreciated, viscose rayon is not considered to be afflicted to a troublesome degree with problems due to static.

In addition, the graft copolymer-containing sample has good color and hand and is dyeable with all classes of dyestuffs as applied under normal dyeing conditions.

The fiber product dyes well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 46 (Colour Index Basic Red 14).

The dyeing with Calcodur Pink 2BL is performed at the 4 percent level according to conventional procedure in which the fiber sample is maintained for about one hour at the boil in the dye bath which contains the dyestuff in an amount equal to about 4 weight percent of the fiber (OWF), OWF designating on the dry weight of the fiber as defined in U.S. Patent No. 2,931,694. The dye bath also contains sodium sulfate (i.e., Glauber's salt) in an amount equal to about 15 percent OWF and has a bath-to-fiber weight ratio of about 30:1, respectively. After being dyed, the fiber is rinsed thoroughly with water and dried for about 20 minutes at 80° C.

The dye-receptivity of the Calcodur Pink 2BL-dyed fiber is then evaluated spectrophotometrically by measuring the amount of monochromatic light having a wave length of about 520 millimicrons from a standard source that is reflected from the dyed sample. A numerical value on an arbitrarily designated scale from zero to one hundred is thereby obtained. This value represents the relative comparison of the amount of light that is reflected from a standard white tile reflector that has a reflectance value of 316 by extrapolation from the 0–100 scale. Lower reflectance values are an indication of better dye-receptivity in the fiber. For example, a reflectance value of 50 or less is fairly good. A value as low as about 20 to 25 for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval.

The 4 percent Calcodur Pink 2BL reflectance value of the copolymer-containing fiber product is about 18.

The antistatic properties of the graft copolymer-containing fiber are then determined by measuring the electrical conductance of the fiber product at various humidities. As is also appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested are found by determining their electrical resistances. Resistance, of course, is the reciprocal quantity of conductivity. In order to permit various fiber samples to be compared on a common basis, the conductivities of the samples tested were actually measured as volume resistivities according to the following formula:

Volume resistivity $$= \frac{(\text{Resistance})(\text{cross-sectional area})}{\text{Path length between electrodes to which sample being tested is attached}}$$

The units of volume resistivity are ohm-cm.$^2$/cm.

Prior to being tested, the graft copolymer-containing polyacrylonitrile fiber prepared in the indicated manner is vat dyed in the conventional manner with Cibanone Green BF Dbl. Paste (Colour Index Vat Green No. 1). A portion of the vat dyed sample is then subjected to five (5) consecutive No. 3–A accelerated wash tests in accordance with the American Association of Textile Chemists and Colorists (AATCC) Manual. The actual resistivity of the merely vat dyed sample as well as that of the sample that has been both vat dyed and washed are then determined (after the samples being tested are conditioned for seventy-two hours at the particular temperature and relative humidity conditions involved in each of the tests) by tautly connecting a web-like sample of the yarn between two electrodes, each of which are 9 centimeters long spaced parallel 13 centimeters apart, and across which there is applied a 900 volt direct current potential. For purposes of comparison, the volume resistivities of cotton, wool and an unmodified polyacrylonitrile fiber (obtained in the same way as the copolymer-containing fiber but without having the graft copolymeric additament incorporated therein) are also tested in the indicated manner along with the graft copolymer-containing synthetic fiber product in accordance with the present invention.

The results are set forth in the following tabulation which indicates the volume resistivities obtained at various relative humidities (RH) at 23° C. of each of the samples tested.

*Table 1.—Volume Resistivities of Various Fiber Samples Compared to Polyacrylonitrile Fibers Impregnated With Graft Copolymer of Sodium Styrene Sulfonate on PVM*

| Sample | Volume Resistivity, ohm-cm.$^2$/cm. | | | |
|---|---|---|---|---|
| | 32 percent R.H. | 47 percent R.H. | 58 percent R.H. | 66 percent R.H. |
| Vat dyed graft copolymer-containing fiber | 8.5×10$^{11}$ | 5.6×10$^{10}$ | 7×10$^9$ | 9.2×10$^6$ |
| Vat dyed and 5X wash tested graft copolymer-containing fiber | 1.6×10$^{12}$ | 3.2×10$^{10}$ | 1.8×10$^9$ | 9.9×10$^6$ |
| Cotton | 6.4×10$^9$ | 2.7×10$^8$ | 3.0×10$^7$ | 5.4×10$^6$ |
| Wool | 5×10$^{12}$ | 2×10$^{11}$ | 1.9×10$^{10}$ | 3.3×10$^9$ |
| Unmodified polyacrylonitrile fiber | 3×10$^{14}$ | 2.7×10$^{13}$ | 5×10$^{12}$ | 1.2×10$^{12}$ |

As is apparent in the foregoing, the graft copolymer-containing samples, even after being vat dyed, and dyed and severely washed, have electrical conductance properties much superior to ordinary polyacrylonitrile and only slightly poorer than cotton. At the same time, the physical properties of the copolymer-containing fibers are excellent, being about equal to those of the unmodified polyacrylonitrile fiber.

ILLUSTRATION C

Following the procedure of Illustration A and using the same monomeric diester as therein described, a graft copolymer product is prepared from the following charge:

| | | |
|---|---|---|
| Monomeric diester from Illustration A | grams | 1.1 |
| PVM (as in Illustration A) | do | 2.6 |
| Water | ml | 19.0 |
| Potassium persulfate | grams | 0.02 |

The pH of the reaction mass is adjusted to about 9.5 with sodium hydroxide. The graft copolymerization is carried out for 16 hours at 50° C. A colorless, water-insoluble graft copolymer product is obtained that is easily dispersible in water in order to form aqueous dispersions suitable for impregnation of acrylonitrile polymer fibers in accordance with the technique set forth in Illustration B. About 84.3 percent of the monomeric diester is found to be converted to graft copolymer product. The product graft copolymer is found to contain about 74 percent of PVM and about 26 percent of graft copolymerized diester substituents. When the graft copolymer product is incorporated in polyacrylonitrile fibers in the manner set forth in the second example, it is found to be an excellent dye-assisting additive and permanent antistatic agent for the fibers. The graft copolymer-containing fibers has good dye-receptivity, excellently low static characteristics and excellent physical properties.

ILLUSTRATION D

Using the same apparatus as described in Illustration A, a monomeric dimethacrylate ester of a polyglycol is prepared from the following charge:

| | | |
|---|---|---|
| Polyglycol having average molecular weight of about 6000 and of the structural formula: HO—(CH$_2$CH$_2$O)$_{120}$—CH$_2$CH$_2$OH | grams | 1000 |
| Methyl methacrylate | do | 200 |
| Para-toluene sulfonic acid | do | 20 |
| Hydroquinone | do | 10 |

The charged ingredients in the reactor are heated to a temperature of about 120° C. The fractionating column on the apparatus is operated at total reflux until the overhead temperature comes to about 65° C. After this, distillate is removed from the column at 65–68° C. for a 4-hour period. The excess methyl methacrylate is then removed under vacuum (2 mm. Hg absolute) for 2 hours. One liter of water is then added to the monomer-containing reaction mass and the polymeric solids filtered out. The resulting aqueous monomer solution is then passed through a bed of "Dowex 1" ion exchange resin to remove the hydroquinone polymerization inhibitor. The uninhibited aqueous monomer solution is then stored at about −30° C. until ready for use.

About 37.4 grams of the monomeric dimethacrylate ester of the polyglycol is then mixed with about 87.0 grams of PVM having a Fikentscher K-value of about 45; 499 grams of water; and 0.4 gram of azobisisobutyronitrile. The charge, having a pH of about 6, is graft copolymerized in the manner set forth in the preceding illustrations over a 24-hour period at 50° C. under nitrogen. At the end of this period, more than 50 percent of the monomer is converted to a graft copolymer product which is water insoluble, but which can be easily dispersed in water by simple mechanical means. The graft copolymer product is found to contain about 18 percent of the graft copolymerized dimethacrylate polyglycol diester units and about 82 percent of PVM. It is found to be an excellent dye additive and permanent antistatic agent for acrylonitrile polymer fibers when it is incorporated in them in the manner set forth in the second illustration. The graft copolymer-containing fibers have good dye-receptivity, excellent static characteristics, satisfactory stability and suitable physical properties.

ILLUSTRATION E

The general procedure of Illustration D is employed to prepare a mixed graft copolymer from the following charge which is polymerized under nitrogen for about 18 hours at a temperature of 50° C.:

|  | Grams |
|---|---|
| Monomeric diester (from Illustration D) | 34.0 |
| Sodium styrene sulfonate | 1.1 |
| PVM (Fikentscher K-value of 45) | 82.0 |
| Water | 468.5 |
| Potassium persulfate | 0.8 |

Conversion of the monomers to graft copolymer product is found to be about 90 percent. The graft copolymer product is found to contain about 27 percent of graft copolymerized polyglycol diester units; about 1 percent of graft copolymerized sodium styrene sulfonate units; and about 72 percent of the PVM "backbone" substrate. As in the foregoing illustrations, the graft copolymer product is found to be an excellent dye-assisting additive, stabilizer and permanent anti-static agent for acrylonitrile polymer fibers when it is incorporated in them according to the manner set forth in the second illustration. The graft copolymer-containing fibers have very good acceptance of any of a wide variety of dyestuffs, extremely low static characteristics and suitable stability and physical properties.

ILLUSTRATION F

An excellent graft copolymer product well suited for purposes of the present invention is made by polymerizing about 6 grams of tetramethyleneglycoldimethacrylate and 6 grams of K–30 PVM in 48 grams of water at 50° C. under nitrogen for 16 hours using 0.12 gram potassium persulfate as a catalyst, with the reaction mass having a pH of about 3. Conversion to graft copolymer product (obtained as a soft, white insoluble gel) is about 91 percent.

Excellent results may also be obtained when the foregoing is repeated to prepare graft copolymer additives from other N-vinyl-3-morpholinone polymer substrates, such as copolymers of VM with N-vinyl-2-pyrrolidone; N-vinyl piperidone and other vinyl lactam monomers; N-vinyl-2-oxazolidinone; N-vinyl-5-methyl-2-oxazolidinone; N-vinyl-5-ethyl-2-oxazolidinone; N-vinyl-2-oxazinidinone; and other N-vinyl cyclic carbamate monomers, and so forth, within the compositional ranges detailed below.

These N-vinyl-3-morpholinone polymers and their preparation are discussed in U.S. Patents 2,952,668, filed April 16, 1958; 2,946,772, filed February 27, 1958; and 2,948,708, filed April 3, 1958; and in the copending application for U.S. patent having Serial No. 692,587, filed October 28, 1957, and entitled "N-Vinyl-3-Morpholinone Compounds," now U. S. Patent 2,987,509.

Results similar to those set forth in the foregoing can likewise be obtained when the graft copolymer additaments are incorporated in polyacrylonitrile and other acrylonitrile polymer fibers to provide articles in accordance with the present invention by blending the graft copolymer and the fiber-containing acrylonitrile polymer in a spinning composition or dope prior to its extrusion into filamentary products by either wet spinning or dry spinning techniques. In such instances, incidentally, it may be desirable, in order to secure optimum benefit in the practice of the invention, to employ relatively larger quantities of the graft copolymeric additament than when surface impregnation is performed so that the presence of effective quantities of the additament at or near the peripheral portion of the article is assured.

The monomeric diacrylate and dimethacrylate esters of polyglycols that are employed for the preparation of the graft copolymers in the practice of the present invention are, as is indicated in the foregoing, prepared from the esterification of polyethylene or polypropylene glycols, mixtures of such polyglycols, or mixed polyethylene-polypropylene polyglycols with acrylic or methacrylic acids, respectively, or methyl or ethyl esters or other reactive derivatives of such acids. The polyglycols that are employed for the preparation of the difunctional monomeric diesters must be "double-ended," i.e., have active hydroxyl groups at both ends and not the monoether or similar polyglycols which have other non-reactive terminal substitutions. Advantageously, the polyglycols that are employed for the preparation of the monomers have molecular weights from about 300 to 9,000, preferably between about 600 and 1,200. The monomeric diesters utilized in the practice of the present invention may be represented by the generic formula:

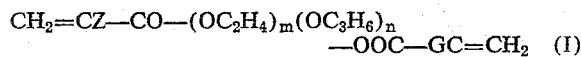

$$CH_2=CZ-CO-(OC_2H_4)_m(OC_3H_6)_n-OOC-GC=CH_2 \quad (I)$$

wherein Z and G are independently selected from the group consisting of hydrogen and alkyl radicals containing from 1 to about 2 carbon atoms (advantageously being hydrogen or methyl); $m$ is a number having an average value from 6 to 100; and $n$ is a number having an average value from 0 to about 10, with the limitation that the value of $n$ is less than about half the value of $m$.

If desired, as has been indicated and demonstrated, the monomeric diesters used in the present invention may be employed in combination or mixture with other varieties of monomers in order to prepare mixed graft copolymers having specific properties and effects, particularly with respect to their capability for accepting greater numbers of diverse types of dyestuffs. For example, the monomeric diacrylate and dimethacrylate esters of the polyglycols generally provide graft copolymers showing excellent acceptance of acid or direct types of dyestuffs. However, other varieties of monomers, such as those which may provide acidic chemical characteristics in the resulting graft copolymer structure, may frequently be used with great advantage to enhance the dye-attracting potency of the resulting graft copolymeric additive to basic dyestuffs.

Thus, it may frequently be an advantage to graft copolymerized mixtures of the monomeric diesters with monomeric, alkenyl group-containing, organic sulfonic acids or derivatives thereof that are selected from the group of such compounds (including mixtures thereof) consisting of those represented by the formulae:

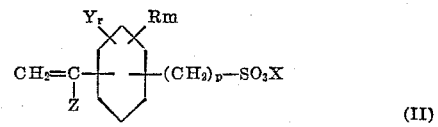

(aromatic organic sulfonic acid compounds)

$$CH_2=CH-(CH_2)_m-SO_3X \quad (III)$$

(alkenyl organic sulfonic acid compounds)

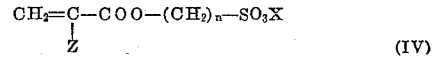

(sulfoalkylacrylate organic sulfonic acid compounds)

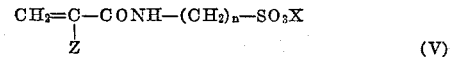

(acryloyl taurine homolog compounds)

and

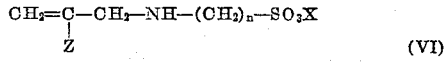

(allyl taurine homolog compounds)

all wherein X is hydrogen, an aliphatic hydrocarbon radical containing from 1 to 4 carbon atoms or an alkali metal ion (including sodium, potassium and lithium); Y is hydrogen, chlorine or bromine; R is methyl or ethyl; Z is hydrogen or methyl; m has a numerical value in whole number increments from 0 to 2; n has a numerical value of 1 to 2; p is 0 or 1; and r has a numerical value of 1 to 4.

Besides those specifically illustrated herein, other organic sulfonic acid compounds may also be utilized in mixture with the monomeric polyglycol diesters for preparation of the water-insoluble graft copolymeric additaments that may advantageously be employed in the practice of the present invention include such organic sulfonic acids as 2-propene sulfonic acid; sodium para-vinylbenzene sulfonate; 2- and/or 3-sulfopropyl acrylate; d-sulfoacrylic acid; sodium vinyl toluene sulfonate; potassium ortho-chlorostyrene sulfonate; 2-hydroxy-3-sulfopropyl acrylate, sodium salt; sodium 3-alloxy-2-hydroxypropane sulfonate; 4-sulfonphenyl acrylate, sodium salt; and N-allyl-imino-di-(2-ethane sulfonic acid). Still others, grouped according to their general structural designations, are set forth in the following representative, but by no means exhaustive, list:

Aromatic alkenyl-containing sulfonic acid compounds (Formula II):
  Para-styrene sulfonic acid
  Ortho-styrene sulfonic acid
  Para-isopropenyl benzene sulfonic acid
  Para-vinyl benzyl sulfonic acid
  Ortho-isopropenyl benzyl sulfonic acid
  Sodium para-styrene sulfonate
  Potassium ortho-styrene sulfonate
  Methyl para-styrene sulfonate
  Ethyl para-vinyl benzyl sulfonate
  Ortho-vinylbenzene sulfonic acid
  Isopropyl ortho-isopropenyl benzene sulfonate
  n-Butyl ortho-styrene sulfonate
  Tertiary butyl para-styrene sulfonate
  2-chloro-4-vinyl benzene sulfonic acid
  4-bromo-2-isopropenyl benzene sulfonic acid
  3-vinyl toluene 6-sulfonic acid, sodium salt
  2-ethyl-4-vinyl-benzene sulfonic acid
  2,3-dichloro-4-vinyl benzene sulfonic acid
  2,3,5-tribromo-4-vinyl benzene sulfonic acid
  2-chloro-3-vinyl-toluene-6-sulfonic acid
  2,3-diethyl-4-vinyl-benzyl sulfonate, sodium salt Alkenyl sulfonic acid compounds (Formula III):
  Ethylene sulfonic acid
  Sodium ethylene sulfonate
  Potassium ethylene sulfonate
  Methyl ethylene sulfonate
  Isopropyl ethylene sulfonate
  1-propene 3-sulfonic acid
  1-propene 1-sulfonic acid, sodium salt
  1-propene 2-sulfonic acid, ethyl ester
  1-butylene 4-sulfonic acid, n-butyl ester
  1-butylene 3-sulfonic acid
  Tertiary butylene sulfonic acid Sulfoalkylacrylate compounds (Formula IV):
  Sulfomethylacrylate
  2-sulfoethylacrylate
  Sulfomethylmethacrylate, sodium salt
  2-sulfoethylmethacrylate, methyl ester
  2-sulfoethylmethacrylate, potassium salt Acryloyl taurine and homolog compounds (Formula V):
  N-acryloyl taurine
  N-acryloyl taurine, sodium salt
  N-methacryloyl taurine, methyl ester
  N-methacryloyl taurine, potassium salt
  N-acryloyl taurine, ethyl ester
  N-acryloyl-aminomethane sulfonic acid
  N-methacryloyl-aminomethane sulfonic acid, sodium salt
  Methyl N-methacryloyl-aminomethane sulfonate Allyl taurine and homolog compounds (Formula VI):
  Allyl taurine
  Allyl taurine, sodium salt
  Allyl taurine, potassium salt
  Methallyl taurine
  Methallyl taurine, methyl ester
  Methallyl taurine, isopropyl ester
  N-allyl-aminomethane sulfonic acid
  Sodium N-allyl-aminomethane sulfonate
  Lithium N-methallyl-aminomethane sulfonate
  n-Butyl N-allyl-aminomethane sulfonate The N-vinyl-3-morpholinone polymers that are utilized as preformed substrates in the preparation of the graft copolymeric additaments of the present invention have, as an essential constituent of their polymeric structure, characterizing proportions of the recurring group

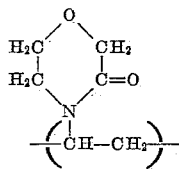

As has been indicated, copolymers of N-vinyl-3-morpholinone may also be employed. Thus, copolymers of N-vinyl-3-morpholinone with various homologous alkyl ring-substituted N-vinyl-3-morpholinone monomers may be utilized, such as copolymers of N-vinyl-3-morpholinone with N-vinyl-5-methyl-3-morpholinone, N-vinyl-5-ethyl-3-morpholinone, and the like. Copolymers of N-vinyl-3-morpholinone with various V-vinyl lactam polymers, such as N-vinyl pyrrolidone, N-vinyl-piperidone, N-vinyl caprolactam, N-vinyl-5-methyl-2-pyrrolidone and the like may also be prepared. Advantages are also achieved with copolymers of N-vinyl-3-morpholinone and various of the N-vinyl-2-oxazolidinone monomers, such as N-vinyl-2-oxazolidinone, N-vinyl-5-methyl-2-oxazolidinone, N-vinyl-5-ethyl-2-oxazolidinone, N-vinyl-2-oxazinidinone, and so forth.

Advantageously, the N-vinyl-3-morpholinone polymer that is used in the manufacture of the graft copolymer product has a Fikentscher K-value between about 5–10 and about 100 and, more advantageously, between about 20–30 and 60.

Beneficially, as mentioned, the N-vinyl-3-morpholinone polymer that is utilized is a water-soluble material. In cases where N-vinyl-3-morpholinone copolymers are employed that tend to water-insolubility with decreasing proportions of N-vinyl-3-morpholinone in the copolymer molecule (as is the case with copolymers of N-vinyl-3-morpholinone and N-vinyl-5-methyl-2-oxazolidinone), it is generally most desirable for the copolymer to contain at least about 40 weight percent of the N-vinyl-3-morpholinone polymerized therein. This avoids working with a product that may have a cloud (or precipitation) point in water or other aqueous solution beneath the boil.

The graft copolymers of the present invention may generally be prepared by methods of polymerization, such as those which have been demonstrated in the foregoing illustrative examples, that employ such polymerization catalysts as persulfates, organic and inorganic peroxide and azo type materials in quantities that are conventional for such uses. The graft copolymers may oftentimes be prepared by polymerizing the monomeric constituent onto the preformed VM substrate under the influence of actinic radiations, such as ultra-violet light, or high energy irradiation, such as by means of X-rays, electron beams, emissions from radioactive sources and the like, or simply by heating or evaporating the monomer and polymer-containing polymerization mixture. The graft copolymers may be prepared in both aqueous and organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 5 to 60 hours.

The compositions of the graft copolymer can vary within rather wide limits. The content of the monomeric polyglycol diester constituent that is graft copolymerized on the preformed VM substrate may advantageously be between about 20 and 80 weight percent of the resulting graft copolymer product and, more advantageously, between about 30 and 50 weight percent. In many cases, especially to secure optimum dye-receptivity, near equivalent or about commensurate or equal weight proportions of the VM polymer and the monomeric diester constituent graft copolymerized thereto may be employed with benefit in the graft copolymeric additaments. When mixtures of the monomeric diesters with monomeric organic sulfonic acids are employed to prepare mixed graft copolymer products on the VM polymer, it is desirable for the total quantity of graft copolymerized constituents on the preformed VM polymer substrate to remain within the above-stated ranges (i.e., from 20 or 30 to 50 or 80 weight percent) with from about 10 to 90 mole percent of the graft copolymerized substituents being comprised of graft copolymerized monomeric polyglycol diester units and, more advantageously, from 30 to 60 mole per cent of the graft copolymerized constituents consisting of polymerized monomeric polyglycol diester units with the balance being polymerized units of monomeric organic sulfonic acid compound upon the 80 to 20 weight percent of the VM polymer that is contained in the graft copolymer structure.

The graft copolymers upon PVM and other VM polymers of the polyglycol diacrylate or dimethacrylate monomers are wax-like solids whose properties depend to some extent on the molecular weight of the precursor polyglycols from which the monomeric diesters are derived. All of the graft copolymer products are cross-linked, water-insoluble materials which, as mentioned and illustrated, may be dispersed readily in water or organic solvents.

The polymerization system that is employed for the preparation of the graft copolymers used in the present invention may consist of as much as 50 weight percent of the monomers to be polymerized in the aqueous or other medium. The amount of polymerizable constituents that are provided in the copolymerization system may be influenced somewhat by the manner in which it is intended to incorporate the product in the synthetic polymer compositions in order to provide the compositions of the invention.

If, for example, it is intended to incorporate the graft copolymer products by blending into a fiber-forming composition prior to its fabrication into shaped articles, the graft copolymerization system may, if desired, contain about equal proportions by weight of the charged polymerizable constituents and the polymerization medium which, preferably, is miscible with and tolerable in the spinning solution solvent being used. In such cases, the graft copolymer product may ordinarily be obtained as an easily dispersed gel that, after being dried and isolated from unreacted monomer, may readily be directly incorporated in the fiber-forming composition.

If the incorporation of the graft copolymeric additament in a fiber-forming composition is to be achieved by impregnation therewith of an already-formed shaped article of the composition, it may be desirable to effect the polymerization so as to directly form the polymerization system as a suitable applicating emulsion or suspension of the graft copolymeric product. For such purposes, the polymerization system may be prepared to contain as little as 2 or 10 percent by weight of the polymerizable monomeric and polymeric ingredients. Preferably, such a polymerization may be conducted under the influence of vigorous agitation to facilitate preparation of an emulsified or thoroughly dispersed product. It may also be beneficial under such circumstances although it is usually not necessary to incorporate a dispersant or emulsifying agent in the polymerization system to facilitate obtaining a stable and homogeneous emulsified product. Such a method for preparing the graft copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the emulsified, water-insoluble, graft copolymeric additaments may be impregnated into the fiber while it is in a swollen or gel condition, as an acrylonitrile polymer fiber in an aquagel condition, in order to obtain the desired copolymer-containing product.

In this connection, when it is desired to blend the graft copolymeric additament in a synthetic polymer fiber-forming solution prior to its extrusion, such as an aqueous saline acrylonitrile polymer solution, the water-insoluble graft copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous to comminute the graft copolymer in the presence of the non-dissolving solvent, such as an aqueous saline solvent for polyacrylonitrile, to form a stable suspension that may be more conveniently blended with the spinning solution of the synthetic polymer, such as an aqueous, saline acrylonitrile polymer spinning solution.

Thus, if the aqueous saline solvent for polyacrylonitrile that is being employed is an aqueous solution of zinc chloride or its equivalent that contains at least about 55 weight percent and preferably about 60 weight percent of dissolved zinc chloride, it may be advantageous to comminute the graft copolymeric additament while it is in a mixture with the saline solvent solution that contains between about 5 and 10 weight percent of the copolymer. Analogous procedures may be employed when other solvents are involved. Ball or rod mills or other attrition apparatus may be employed satisfactorily for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of the graft copolymeric additament in the acrylonitrile polymer solvent that is suitable for blending in the spinning solution of the acrylonitrile polymer to provide a spinnable composition may usually be obtained by milling the mixture of graft copolymeric additament and solvent for an extended period that may exceed 100 hours. The suspension that is thereby obtained may then be directly blended in the proper proportions with the acrylonitrile polymer spinning solution to provide a composition in accordance with the present invention.

If desired, the copolymer-containing acrylonitrile polymer compositions may comprise as much as 20 or more weight percent of the graft copolymeric additament, based on the weight of the composition. Usually, however, suitable properties and characteristics and better fiber-forming properties in a given composition may be achieved when lesser proportions of the copolymeric additament are incorporated therein. An appreciable improvement in dye-receptivity, antistatic properties and stability may frequently be obtained when a quantity of the copolymeric additament that is as small as 3 (and even as low as 1 or less) percent by weight is employed. Advantageously, an amount between about 3 and 15 percent by weight of the copolymeric additament may thus be utilized in the composition. Greater advantages may often accrue when the amount of the copolymeric additament that is incorporated in the composition is in the neighborhood of 6–10 percent by weight, based on the weight of the composition.

As has been indicated, the graft copolymeric additaments may be incorporated in the acrylonitrile polymer compositions according to various techniques. Thus, for example, the copolymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dissolving or otherwise dispersing them in a suitable liquid medium. Or, the compositions may be provided in fiber-forming system by sequentially dispersing the polymers in any desired order in a suitable medium, as by incorporating the graft copolymeric additament in a prepared acrylonitrile polymer spinning solution, dope or the like.

As is evident from the illustrative examples heretofore included, a highly advantageous technique for providing the compositions, particularly when acrylonitrile polymer fiber products are involved, is to apply or impregnate the copolymeric additament from an aqueous dispersion thereof to a shaped acrylonitrile polymer article that is in an aquagel condition in a known manner. Thus, an acrylonitrile polymer filamentary article that has been spun from an aqueous saline spinning solution may be conveniently passed, after its coagulation and while it is in an aquagel condition, through a water bath containing the dissolved graft copolymeric additament in order to impregnate the filament with the graft copolymer and provide a composition and an article in accordance with the invention.

In addition, it is oftentimes possible for in situ polymerization techniques to be accomplished and relied upon to provide the graft copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulating according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole figure of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63; such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness and retain the dye-assisting polymeric additament in a substantially permanent manner despite repeated exposure and subjection to washing, laundering and dry cleaning treatments.

What is claimed is:

1. Graft copolymer comprising between about 20 and about 80 weight percent of (a) a monomeric polyfunctional diester of a polyglycol having the formula:

$$CH_2=CZ—CO—(OC_2H_4)_m(OC_3H_6)_n—OOC—GC=CH_2 \quad (I)$$

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than about half of the value of $m$; and (b) from about 80 to about 20 weight percent of a polymer of a monoethylenically unsaturated monomeric material containing at least about 10 weight percent of N-vinyl-3-morpholinone.

2. The graft copolymer of claim 1, containing in the polymer molecule between about 30 and about 50 weight percent of said monomer graft copolymerized on said N-vinyl-3-morpholinone polymer.

3. The graft copolymer of claim 1, wherein said polymer is poly-N-vinyl-3-morpholinone.

4. Graft copolymer comprising between about 20 and about 80 weight percent of (a) a mixture of monomers consisting of from about 10 to about 90 mole percent of (1) a monomeric diester of a polyglycol of the formula:

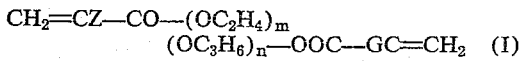

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than about half of the value of $m$; and (2) from about 90 to about 10 mole percent of at least one monomeric, alkenyl group-containing organic sulfonic acid compound selected from the group consisting of those represented by the formulae:

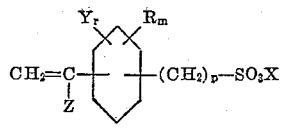

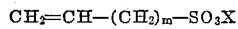

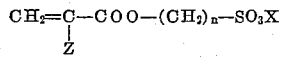

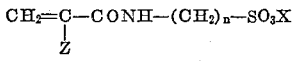

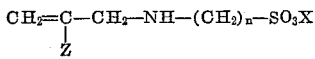

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; and $p$ is an integer from 0 to 1; and $r$ is an integer from 1 to 4; and (b) from about 80 to about 20 weight percent of a polymer of a monoethylenically unsaturated monomeric material containing at least about 10 weight percent of N-vinyl-3-morpholinone.

5. Method for the preparation of a graft copolymer which comprises polymerizing between about 20 and about 80 weight percent, based on resulting graft copolymer weight, of a monomeric diester of a polyglycol having the formula:

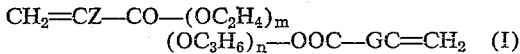

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than about half of the value of $m$; with between about 80 and about 20 weight percent of a polymer of a monoethylenically unsaturated monomeric material containing at least about 10 weight percent of N-vinyl-3-morpholinone.

6. Method for the preparation of a graft copolymer which comprises polymerizing between about 20 and about 80 weight percent, based on resulting graft copolymer weight, of (a) a mixture of monomers consisting of from about 10 to about 90 mole percent of (1) a monomeric diester of a polyglycol of the formula:

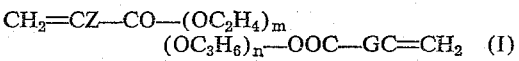

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than about half of the value of $m$; and (2) from about 90 to 10 mole percent of at least one alkenyl group-containing organic sulfonic acid selected from the group consisting of those having the formulae:

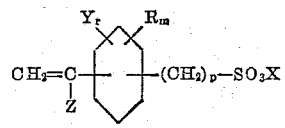

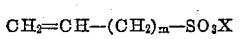

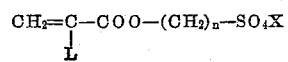

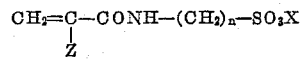

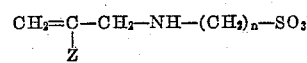

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; and $p$ is an integer from 0 to 1; and $r$ is an integer from 1 to 4; with (b) between about 80 and about 20 weight percent of a polymer of a monoethylenically unsaturated monomeric material containing at least about 10 weight percent of N-vinyl-3-morpholinone.

7. Composition comprising a major proportion of at least about 80 weight percent, based on composition weight, of (A) a fiber forming polymer of an ethylenically unsaturated monomeric material containing at least about 80 weight percent of acrylonitrile, and (B) a minor proportion of up to about 20 weight percent, based on composition weight, of a graft copolymer of (a) between about 20 and about 80 weight percent of a monomeric diester of a polyglycol having the formula:

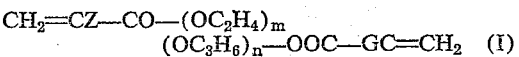

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than about half of the value of $m$; and (b) from about 80 to about 20 weight percent of a polymer of a monoethylenically unsaturated monomeric material containing at least about 10 weight percent of N-vinyl-3-morpholinone.

8. The composition of claim 7 containing between about 4 and about 15 weight percent, based on composition weight, of said graft copolymer.

9. The composition of claim 7, wherein component (B) is a graft copolymer of a monomer of said Formula I wherein $m$ is 2 and $n$ is 0 and G and Z are both methyl and poly-N-vinyl-3-morpholinone.

10. The composition of claim 7, wherein component (B) is a graft copolymer of a monomer of said Formula I wherein $m$ is 12 and $n$ is 0 and G and Z are both methyl and poly-N-vinyl-3-morpholinone.

11. The composition of claim 7, wherein component (B) is a graft copolymer of a monomer of said Formula I wherein $m$ is 15 and $n$ is 3 and G and Z are both methyl and poly-N-vinyl-3-morpholinone.

12. The composition of claim 7, wherein the acrylonitrile polymer is polyacrylonitrile.

13. The composition of claim 7, dispersed in a solvent for polyacrylonitrile.

14. A filamentary shaped article comprised of the composition of claim 7.

15. Composition comprising a major proportion of at least about 80 weight percent, based on composition weight of (A) a fiber forming polymer of an ethylenically unsaturated monomeric material containing at least about 80 weight percent of acrylonitrile, and (B) a minor proportion of up to about 20 weight percent, based on composition weight, of a graft copolymer of (a) between about 20 and about 80 weight percent of a mixture of monomers consisting of (1) from about 10 to about 90 mole percent of a monomeric diester of a polyglycol of the formula:

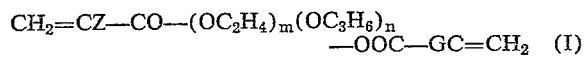

$$CH_2=CZ-CO-(OC_2H_4)_m(OC_3H_6)_n$$
$$-OOC-GC=CH_2 \quad (I)$$

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than about half of the value of $m$; and (2) from about 90 to about 10 mole percent of at least one monomeric alkenyl group-containing organic sulfonic acid compound selected from the group consisting of those having the formulae:

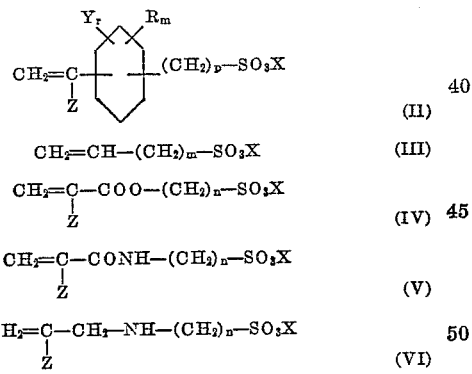

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; and $p$ is an integer from 0 to 1; and $r$ is an integer from 1 to 4; and (b) from about 80 to about 20 weight percent of a polymer of a monoethylenically unsaturated monomeric material containing at least about 10 weight percent of N-vinyl-3-morpholinone.

16. Method for the preparation of a dye-receptive, antistatic, stable to light and heat, synthetic, linear, hydrophobic polymer composition which comprises immersing an aquagel of a fiber forming polymer of an ethylenically unsaturated monomeric material containing at least about 80 weight percent of acrylonitrile in the form of a shaped article into a dispersion of a graft copolymer of (a) between about 20 and about 80 weight percent of a monomeric diester of a polyglycol of the formula:

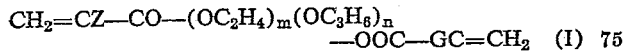

$$CH_2=CZ-CO-(OC_2H_4)_m(OC_3H_6)_n$$
$$-OOC-GC=CH_2 \quad (I)$$

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than half of the value of $m$; and (b) from about 80 to about 20 weight percent of a polymer of a monoethylenically unsaturated monomeric material containing at least about 10 weight percent of N-vinyl-3-morpholinone, until between about 2 and about 20 weight percent of said graft copolymer, based on resulting dry composition weight, is incorporated in said aquagel; and drying said graft copolymer-containing aquagel to convert it from the aquagel condition to a finished shaped article form.

17. Method for the preparation of a dye-receptive, antistatic, stable to light and heat, synthetic, linear hydrophobic polymer composition which comprises immersing an aquagel of a fiber forming polymer of an ethylenically unsaturated monomeric material containing at least about 80 weight percent of acrylonitrile in the form of a shaped article into a dispersion of a graft copolymer of (a) between about 20 and about 80 weight percent of a mixture of monomers consisting of (1) from about 10 to about 90 mole percent of a monomeric diester of a polyglycol of the formula:

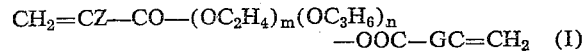

$$CH_2=CZ-CO-(OC_2H_4)_m(OC_3H_6)_n$$
$$-OOC-GC=CH_2 \quad (I)$$

wherein Z and G are independently selected from the group consisting of hydrogen and alkyl radicals containing from 1 to 2 carbon atoms; $m$ is a number having an average value from 6 to 100; and $n$ is a number having an average value from 0 to 10; with the limitation that the value of $n$ is less than about half of the value of $m$; and (2) from about 90 to about 10 mole percent of at least one monomeric alkenyl group-containing organic sulfonic acid compound selected from the group consisting of those having the formulae:

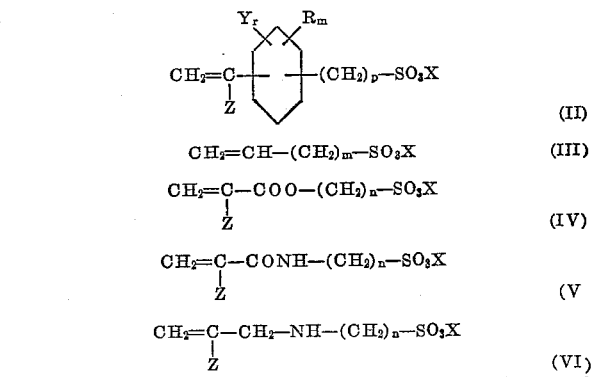

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; and $p$ is an integer from 0 to 1; and $r$ is an integer from 1 to 4; and (b) from about 80 to about 20 weight percent of a polymer of monoethylenically unsaturated monomeric material containing at least about 10 weight percent of N-vinyl-3-morpholinone, until between about 2 and about 20 weight percent of said graft copolymer based on resulting dry composition weight, is incorporated in said aquagel; and drying said graft copolymer-containing aquagel to convert it from the aquagel condition to a finished shaped article form.

References Cited in the file of this patent

UNITED STATES PATENTS 2,614,289     Cresswell et al. _____ Oct. 21, 1952